US007139360B2

(12) United States Patent
Lahoda

(10) Patent No.: US 7,139,360 B2
(45) Date of Patent: Nov. 21, 2006

(54) USE OF BORON OR ENRICHED BORON 10 IN $UO_2$

(75) Inventor: Edward J. Lahoda, Pittsburgh, PA (US)

(73) Assignee: Westinghouse Electric Co. LLC, Pittsburgh, PA (US)

( * ) Notice: Subject to any disclaimer, the term of this patent is extended or adjusted under 35 U.S.C. 154(b) by 131 days.

(21) Appl. No.: 10/965,372

(22) Filed: Oct. 14, 2004

(65) Prior Publication Data

US 2006/0109946 A1 May 25, 2006

(51) Int. Cl.
*G21C 3/00* (2006.01)

(52) U.S. Cl. ............... 376/419; 376/412; 376/416; 376/447; 376/423

(58) Field of Classification Search ............... 376/419, 376/416, 412, 447, 423
See application file for complete search history.

(56) References Cited

U.S. PATENT DOCUMENTS

| | | | |
|---|---|---|---|
| 3,349,152 A | 10/1967 | Watanabe et al. | |
| 3,361,857 A * | 1/1968 | Rose | 264/0.5 |
| 3,427,222 A * | 2/1969 | Biancheria et al. | 376/419 |
| 3,520,958 A | 7/1970 | Verteeg et al. | |
| 4,560,575 A | 12/1985 | Eisenstatt et al. | |
| 4,587,087 A | 5/1986 | Radford et al. | |
| 4,671,927 A * | 6/1987 | Alsop | 376/419 |
| 4,683,114 A * | 7/1987 | Ho et al. | 376/419 |
| 4,708,845 A * | 11/1987 | Mildrum et al. | 376/435 |
| 4,774,051 A | 9/1988 | Peehs et al. | |
| 4,783,308 A * | 11/1988 | Taleyarkhan | 376/370 |
| 4,818,477 A | 4/1989 | Chubb | |
| 4,997,596 A * | 3/1991 | Proebstle et al. | 252/638 |
| 5,075,075 A | 12/1991 | Kapil | |
| 5,147,598 A | 9/1992 | Kapil | |
| 5,250,231 A * | 10/1993 | Grossman et al. | 252/636 |
| 5,337,337 A | 8/1994 | Aoyama et al. | |
| 5,642,390 A * | 6/1997 | Cura et al. | 376/419 |
| 5,978,431 A * | 11/1999 | Edwards | 376/261 |
| 2001/0022827 A1* | 9/2001 | Gradel et al. | 376/409 |

* cited by examiner

*Primary Examiner*—Ricardo Palabrica

(57) ABSTRACT

The present invention provides a nuclear fuel assembly, where a boron-containing compound is used as a burnable poison and is distributed in a majority of the rods in the assembly. The assembly comprises a plurality of fuel rods, each fuel rod containing a plurality of nuclear fuel pellets, wherein at least one fuel pellet in more than 50% of the fuel rods in the fuel assembly comprises a sintered admixture of a metal oxide, metal carbide or metal nitride and a boron-containing compound.

12 Claims, 4 Drawing Sheets

USE OF BORON OR ENRICHED BORON 10 IN UO$_2$

FIELD OF THE INVENTION

The present invention relates to a nuclear fuel assembly, to be used in a nuclear power reactor. The fuel assembly contains fuel pellets having a boron-containing compound in admixture with the nuclear fuel.

BACKGROUND INFORMATION

In a typical nuclear reactor, such as a pressurized water (PWR), heavy water or a boiling water reactor (BWR), the reactor core includes a large number of fuel assemblies, each of which is composed of a plurality of elongated fuel elements or rods. The fuel rods each contain fissile material such as uranium dioxide (UO$_2$) or plutonium dioxide (PUO$_2$), or mixtures of these, usually in the form of a stack of nuclear fuel pellets, although annular or particle forms of fuel are also used. The fuel rods are grouped together in an array which is organized to provide a neutron flux in the core sufficient to support a high rate of nuclear fission and thus the release of a large amount of energy in the form of heat. A coolant, such as water, is pumped through the core in order to extract some of the heat generated in the core for the production of useful work. Fuel assemblies vary in size and design depending on the desired size of the core and the size of the reactor.

When a new reactor starts, its core is often divided into a plurality, e.g. three or more groups of assemblies which can be distinguished by their position in the core and/or their enrichment level. For example, a first batch or region may be enriched to an isotopic content of 2.0% uranium-235. A second batch or region may be enriched to 2.5% uranium-235, and a third batch may be enriched to 3.5% uranium-235. After about 10–24 months of operation, the reactor is typically shut down and the first fuel batch is removed and replaced by a new batch, usually of a higher level of enrichment (up to a preferred maximum level of enrichment). Subsequent cycles repeat this sequence at intervals in the range of from about 8–24 months. Refueling as described above is required because the reactor can operate as a nuclear device only so long as it remains a critical mass. Thus, nuclear reactors are provided with sufficient excess reactivity at the beginning of a fuel cycle to allow operation for a specified time period, usually between about six to eighteen months.

Since a reactor operates only slightly supercritical, the excess reactivity supplied at the beginning of a cycle must be counteracted. Various methods to counteract the initial excess reactivity have been devised, including insertion of control rods in the reactor core and the addition of neutron absorbing elements to the fuel. Such neutron absorbers, known in the art and referred to herein as "burnable poisons" or "burnable absorbers", include, for example, boron, gadolinium, cadmium, samarium, erbium and europium compounds. Burnable poisons absorb the initial excess amount of neutrons while (in the best case) producing no new or additional neutrons or changing into new poisons as a result of neutron absorption. During the early stages of operation of such a fuel element, excess neutrons are absorbed by the burnable poison, which preferably undergoes transformation to elements of low neutron cross section, which do not substantially affect the reactivity of the fuel element in the later period of its life when the neutron availability is lower.

Sintered pellets of nuclear fuel having an admixture of a boron-containing compound or other burnable poison are known. See, for example, U.S. Pat. Nos. 3,349,152; 3,520,958; and 4,774,051. However, nuclear fuel pellets containing an admixture of a boron burnable absorber with the fuel have not been used in large land-based reactors due to concerns that boron would react with the fuel, and because the use of boron was thought to create high internal rod pressurization from the accumulation of helium in the reaction:

$^{10}$B+$^1$n→$^{11}$B(excited state)→$^4$He+$^7$Li

Current practice is to coat the surface of the pellets with a boron-containing compound such as ZrB$_2$, which avoids any potential reaction with the fuel. However, this does not solve the pressurization problem, which limits the amount of coating that can be contained within each rod. More rods with a lower $^{10}$B loading must be used, thus necessitating the handling and coating of a large number of fuel pellets, which is very expensive and results in high overhead costs. Complex manufacturing operations also result from the need to separate the coated and non-coated fuel manufacturing and assembly operations. In practice, the cost of coating the pellets limits their use, and they are used in as few rods as possible, taking into account the pressurization problem described above. Historically this was acceptable, because fuel cycles were shorter, levels of $^{235}$U enrichment were lower, and overall thermal output of a reactor was lower.

Other compounds such as Gd$_2$O$_3$ and Er$_2$O$_3$ can be added directly to the pellets, but these are less preferred than boron because they leave a long-lived, high cross-section residual reactive material.

Nuclear reactor core configurations having burnable poisons have been described in the art. For example, U.S. Pat. No. 5,075,075 discloses a nuclear reactor core having a first group of rods containing fissionable material and no burnable absorber and a second group of rods containing fissionable material with a burnable absorber, wherein the number of rods in the first group is larger than the number of rods in the second group. The burnable absorber comprises a combination of an erbium compound and a boron compound.

U.S. Pat. No. 5,337,337 discloses a fuel assembly where fuel rods containing a burnable poison element having a smaller neutron absorption cross-section (such as boron) are placed in a region of the core having soft neutron energy and a large thermal neutron flux, while rods having a burnable poison element having a larger neutron absorption cross-section (such as gadolinium) are placed in regions of the core having average neutron energy spectrum. Neither of these prior patents disclose an arrangement of fuel rods in fuel assmeblies in which a majority of fuel rods contain boron alone, as the burnable poison. Neither disclose assembly arrangements suitable for reactors producing over 500 megawatts thermal power.

With the use of longer fuel cycles and higher levels of $^{235}$U enrichment, there remains a need for the development of nuclear fuels and fuel assemblies having integral burnable absorbers that are cost-effective and can extend the life of the fuel without creating additional reactive materials.

SUMMARY OF THE INVENTION

The present invention solves the above need by providing a fuel assembly comprising a plurality of fuel rods, each fuel rod containing a plurality of nuclear fuel pellets, wherein at least one fuel pellet in more than 50% of the fuel rods in the fuel assembly comprises a sintered admixture of an actinide oxide, actinide carbide or actinide nitride and a boron-containing compound. Due to the fact that boron has a relatively low parasitic cross-section as compared to other burnable absorbers, it will typically be necessary to put boron-containing fuel pellets in more than 50% of the rods. It has been found, contrary to previous assumptions, that boron does not interact with the nuclear fuel, and is not the primary cause of pressure in the fuel rods, when the amount of helium produced is compared to the amounts of other fission gases released during fuel use. Preparing fuel with an admixture of boron is much less expensive. Therefore, a greater number of rods can have the boron-containing fuel pellets, providing a greater amount of boron in the core but with less boron in each rod, thus avoiding the pressurization problem. For example, with the use of coated pellets fuel rods will contain about 2 mg boron per inch, whereas with the use of boron directly in the pellet fuel rods will contain about 1–1.5 mg boron per inch, a 25–50% reduction.

By adding either natural or enriched boron to at least one fuel pellet in a majority of the rods in a fuel assembly, reactivity hold-down that is equivalent or superior to that provided by current methods is provided, at much lower cost. Additionally, increasing the number of rods containing boron can reduce the internal fuel rod pressure by a factor of 2 or 3 over that found in current practice. Thus, using lower levels of a boron-containing compound, in combination with its distribution more widely among the fuel rods, provides the benefits of the present invention. As will be appreciated by one skilled in the art, these benefits are most advantageous when the thermal output of the reactor core is above 500 megawatts thermal, in the case of water-cooled reactors, or above 200 megawatts thermal in the case of gas-cooled reactors.

The use of boron in boiling water reactor fuel as a substitute for the currently employed $Gd_2O_3$ and $Er_2O_3$ provides even greater benefits. In addition to simplifying manufacturing and reducing rod pressurization, the space that is taken up by the $Gd_2O_3$ and $Er_2O_3$ in the fuel pellets can be replaced by more $UO_2$ (or other actinide oxide, carbide or nitride), thus allowing more fuel to be loaded in a given size core. Enrichment constraints currently applied on a rod-by-rod basis due to poor thermal conductivity of these rare-earth oxides can be completely avoided, thus yielding a significant simplification in the manufacture of nuclear fuels.

BRIEF DESCRIPTION OF THE DRAWINGS

In the course of the following detailed description, reference will be made to the attached drawings in which.

DETAILED DESCRIPTION OF PREFERRED EMBODIMENTS

Figure 1:
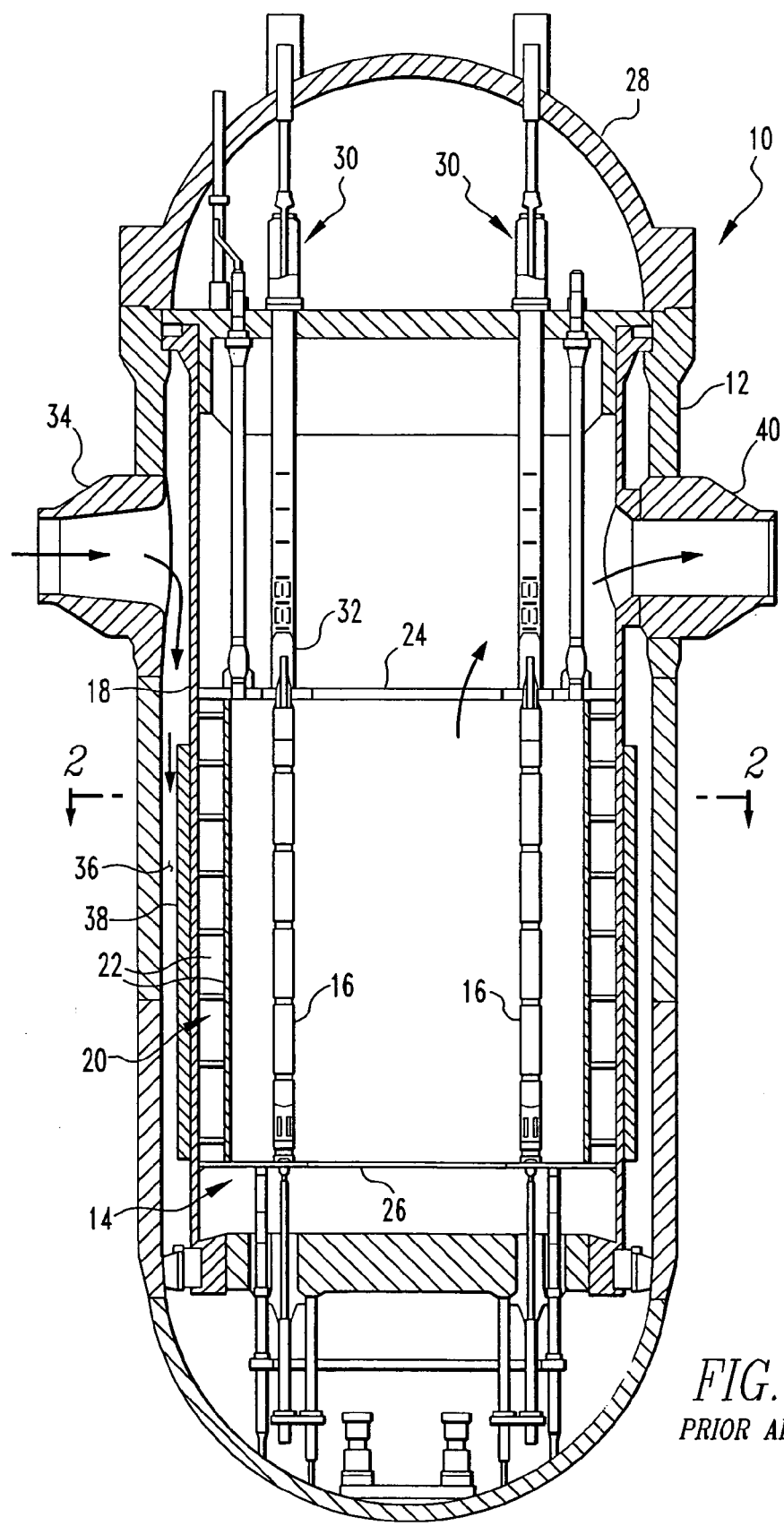
FIG. 1 is a longitudinal view, partly in section and partly in elevation, of a prior art nuclear reactor to which the present invention may be applied.

Accordingly, the present invention provides a fuel assembly comprising a plurality of fuel rods, each fuel rod containing a plurality of nuclear fuel pellets, wherein at least one fuel pellet in more than 50% of said fuel rods in said fuel assembly comprises a sintered admixture of a metal oxide or metal nitride and a boron-containing compound. The boron-containing compound functions as the burnable poison in the fuel. The term "fuel pellet" is used herein to denote the individual sintered pellets of fuel that are loaded into a fuel rod. Preferably, at least one fuel pellet in more than 60% of the fuel rods in the fuel assembly contains a boron-containing compound. Even more preferably, at least one fuel pellet in more than 70–80% of the fuel rods in the fuel assembly contains a boron-containing compound.

When referring to any numerical range of values herein, such ranges are understood to include each and every number and/or fraction between the stated range minimum and maximum. A range of more than 50% of the fuel rods in a fuel assembly, for example, would expressly include all intermediate values between 50 and 100%, including, by way of example only, 51%, 52%, 53%, 60%, 70%, 80%, 85%, 90%, 91%, 92%, 93%, 94%, 100%, and all other intermediate values there between. In one embodiment, at least one fuel pellet in more than 50% of the fuel rods in the fuel assembly comprises an admixture of a boron-containing compound and the nuclear fuel. In other embodiments, at least one fuel pellet in at least 60%, 70%, 80%, 90% or more of the fuel rods in the fuel assembly contain the boron compound.

In the rods having at least one boron-containing fuel pellet, any number of boron-containing fuel pellets can be used, to a maximum of 100% of all the pellets in the rod. Typically, the number of fuel pellets containing boron in a rod will be greater than 50%, but the number of boron-containing pellets in a particular rod will be determined based on all aspects of fuel design, as discussed further below.

Any suitable boron-containing compound can be used, so long as it is compatible with the particular nuclear fuel selected and meets fuel specifications as to density, thermal stability, physical stability, and the like. Suitable boron-containing compounds include, but are not limited to, $ZrB_2$, $TiB_2$, $MoB_2$, $UB_2$, $UB_3$, $UB_4$, $B_2O_3$, $ThB_4$, $UB_{12}$, $B_4C$, $PuB_2$, $PuB_4$, $PuB_{12}$, $ThB_2$, and combinations thereof. Preferred boron-containing compounds are $UB_4$ and $UB_{12}$.

The boron-containing compound and actinide oxide, carbide or nitride are prepared as an admixture and then sintered to produce a fuel pellet. Such methods of preparing nuclear fuel pellets are known in the art; as described above, see U.S. Pat. Nos. 3,349,152; 3,520,958; and 4,774,051. Natural boron or boron enriched in the $^{10}B$ isotope can be used, and any level of enrichment of $^{10}B$ above natural levels is suitable, depending on certain factors. With the use of more enriched boron; the amount of boron-containing compound needed overall decreases, allowing a concomitant increase in fuel loading. However, enriched boron is more expensive than natural boron, and the amount of boron enrichment used will be a cost consideration balanced with other aspects of fuel design.

Accordingly, the amount of boron-containing compound present in a fuel pellet will range between about 5 ppm to about 5 wt %, more preferably between about 10 ppm and 20,000 ppm, based on the total amount of fuel in the fuel pellet, and the amount used will vary depending on the level of uranium enrichment, the level of boron enrichment, and other factors. One skilled in the art of fuel design can easily determine the desired amount of boron-containing compound to use in a fuel pellet, and how many fuel pellets with this desired amount of boron-containing compound to place in a particular number of rods in a fuel assembly. Such calculations are routinely done in design of a fuel load, which must take into account the age of the fuel, the use pattern and activity of the surrounding fuel, the level of uranium-235 in the fuel and the number of neutrons given off. By way of example only, the use of an equal amount of natural boron in all the rods of a batch (if neutronically acceptable) will require boron levels between about 66 and 7,000 ppm, while the use of 100% enriched boron would reduce the level of boron needed to between about 13 and 1200 ppm. It is recognized that the selective boration of individual rods might be preferable neutronically, similar to current poison distribution methods. Fuel rods having fuel pellets with natural boron only, enriched boron only, or a combination of pellets with natural and enriched boron, are all contemplated as being embraced by the present invention.

The boron-containing compound can be used with any suitable nuclear fuel. Examples of suitable nuclear fuels include actinide oxides, actinide carbides and actinide nitrides. Exemplary fuels include, but are not limited to, $UO_2$, $PuO_2$, $ThO_2$, UN, $(U, P)O_2$, $(U, P, Th)O_2$, and $(U, Th)O_2$, other actinide oxides, actinide carbides and actinide nitrides, mixtures of actinide oxides, mixtures of actinide carbides, and mixtures of actinide nitrides.

The above described fuel assembly is suitable and economical for use in fast breeder reactors, as well as reactors that are substantially based on thermal fission such as light or heavy water nuclear reactors, including pressurized water reactors (PWR), boiling water reactors (BWR) and pressurized heavy water reactors (PHWR or CANDU). The fuel assembly is also suitable for use in gas-cooled reactors. Preferably, the thermal output of the reactor core of any of the above reactor types will be above 500 megawatts thermal in the case of water-cooled reactors, and above 200 megawatts thermal in the case of gas-cooled reactors.

In the following description, like reference numbers designate like or corresponding parts throughout the several views. Also in the following description, it is to be understood that such terms as "forward", "rearward", "left", "right", "upwardly", "downwardly", and the like, are words of convenience and are not to be construed as limiting terms.

Figure 2:
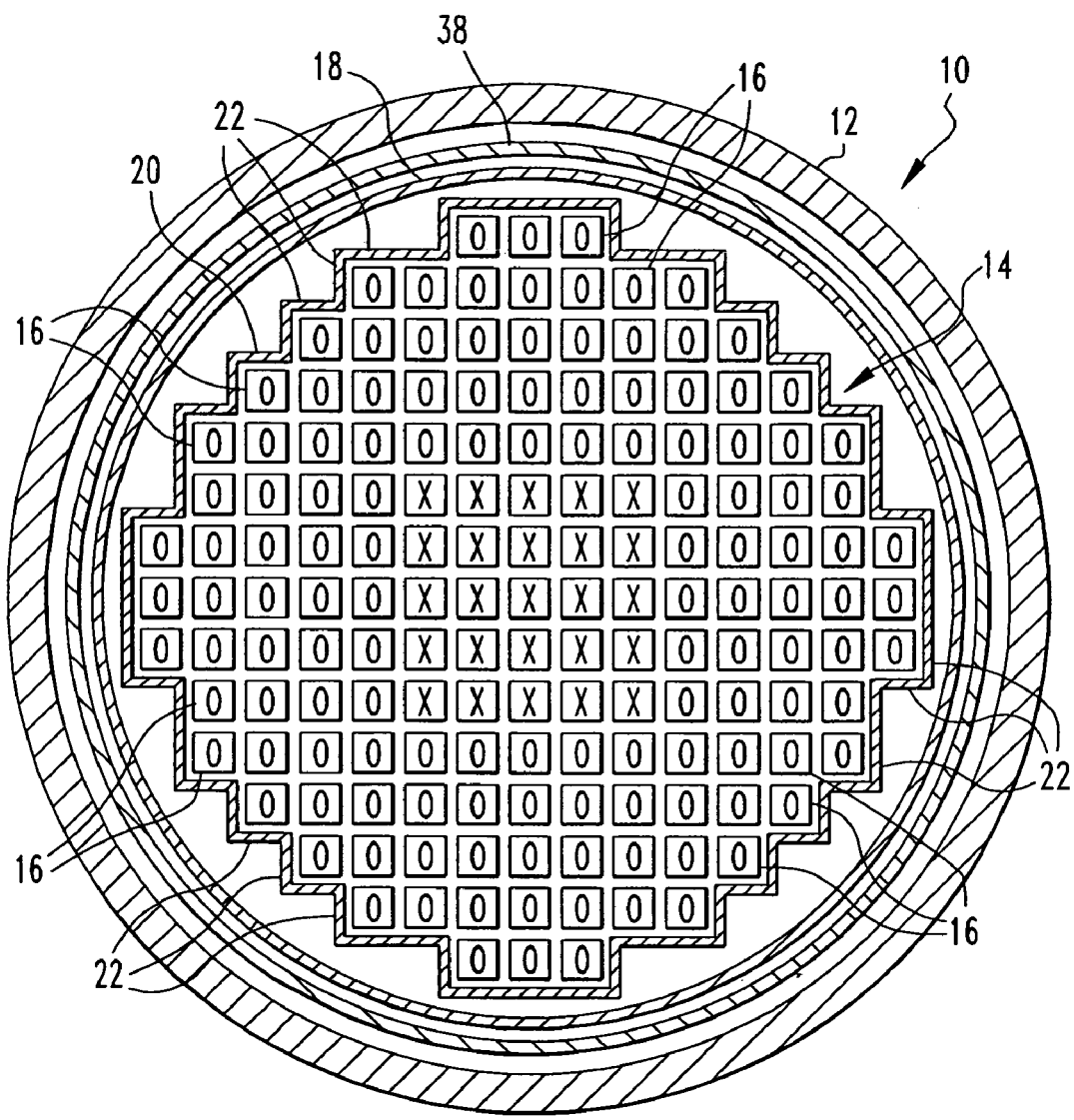
FIG. 2 is a simplified enlarged plan view of the reactor taken along line 2—2 of FIG. 1, but with its core having a construction and arrangement of fuel and boron-containing compound in accordance with the present invention.

Referring now to the drawings, and particularly to FIGS. 1 and 2, there is shown an embodiment of the present invention, by way of example only and one of many suitable reactor types, a pressurized water nuclear reactor (PWR), being generally designated by the numeral 10. The PWR 10 includes a reactor pressure vessel 12 which houses a nuclear reactor core 14 composed of a plurality of elongated fuel assemblies 16. The relatively few fuel assemblies 16 shown in FIG. 1 is for purposes of simplicity only. In reality, as schematically illustrated in FIG. 2, the core 14 is composed of a great number of fuel assemblies.

Spaced radially inwardly from the reactor vessel 12 is a generally cylindrical core barrel 18 and within the barrel 18 is a former and baffle system, hereinafter called a baffle structure 20, which permits transition from the cylindrical barrel 18 to a squared off periphery of the reactor core 14 formed by the plurality of fuel assemblies 16 being arrayed therein. The baffle structure 20 surrounds the fuel assemblies 16 of the reactor core 14. Typically, the baffle structure 20 is made of plates 22 joined together by bolts (not shown). The reactor core 14 and the baffle structure 20 are disposed between upper and lower core plates 24, 26 which, in turn, are supported by the core barrel 18.

The upper end of the reactor pressure vessel 12 is hermetically sealed by a removable closure head 28 upon which are mounted a plurality of control rod drive mechanisms 30. Again, for simplicity, only a few of the many control rod drive mechanisms 30 are shown. Each drive mechanism 30 selectively positions a rod cluster control mechanism 32 above and within some of the fuel assemblies 16.

A nuclear fission process carried out in the fuel assemblies 16 of the reactor core 14 produces heat which is removed during operation of the PWR 10 by circulating a coolant fluid, such as light water with soluble boron, through the core 14. More specifically, the coolant fluid is typically pumped into the reactor pressure vessel 12 through a plurality of inlet nozzles 34 (only one of which is shown in FIG. 1). The coolant fluid passes downward through an annular region 36 defined between the reactor vessel 12 and core barrel 18 (and a thermal shield 38 on the core barrel) until it reaches the bottom of the reactor vessel 12 where it turns 180 degrees prior to following up through the lower core plate 26 and then up through the reactor core 14. On flowing upwardly through the fuel assemblies 16 of the reactor core 14, the coolant fluid is heated to reactor operating temperatures by the transfer of heat energy from the fuel assemblies 16 to the fluid. The hot coolant fluid then exits the reactor vessel 12 through a plurality of outlet nozzles 40 (only one being shown in FIG. 1) extending through the core barrel 18. Thus, heat energy which the fuel assemblies 16 impart to the coolant fluid is carried off by the fluid from the pressure vessel 12.

Due to the existence of holes (not shown) in the core barrel 18, coolant fluid is also present between the barrel 18 and the baffle structure 20 and at a higher pressure than within the core 14. However, the baffle structure 20 together with the core barrel 18 do separate the coolant fluid from the fuel assemblies 16 as the fluid flows downwardly through the annular region 36 between the reactor vessel 12 and core barrel 18.

Figure 3:
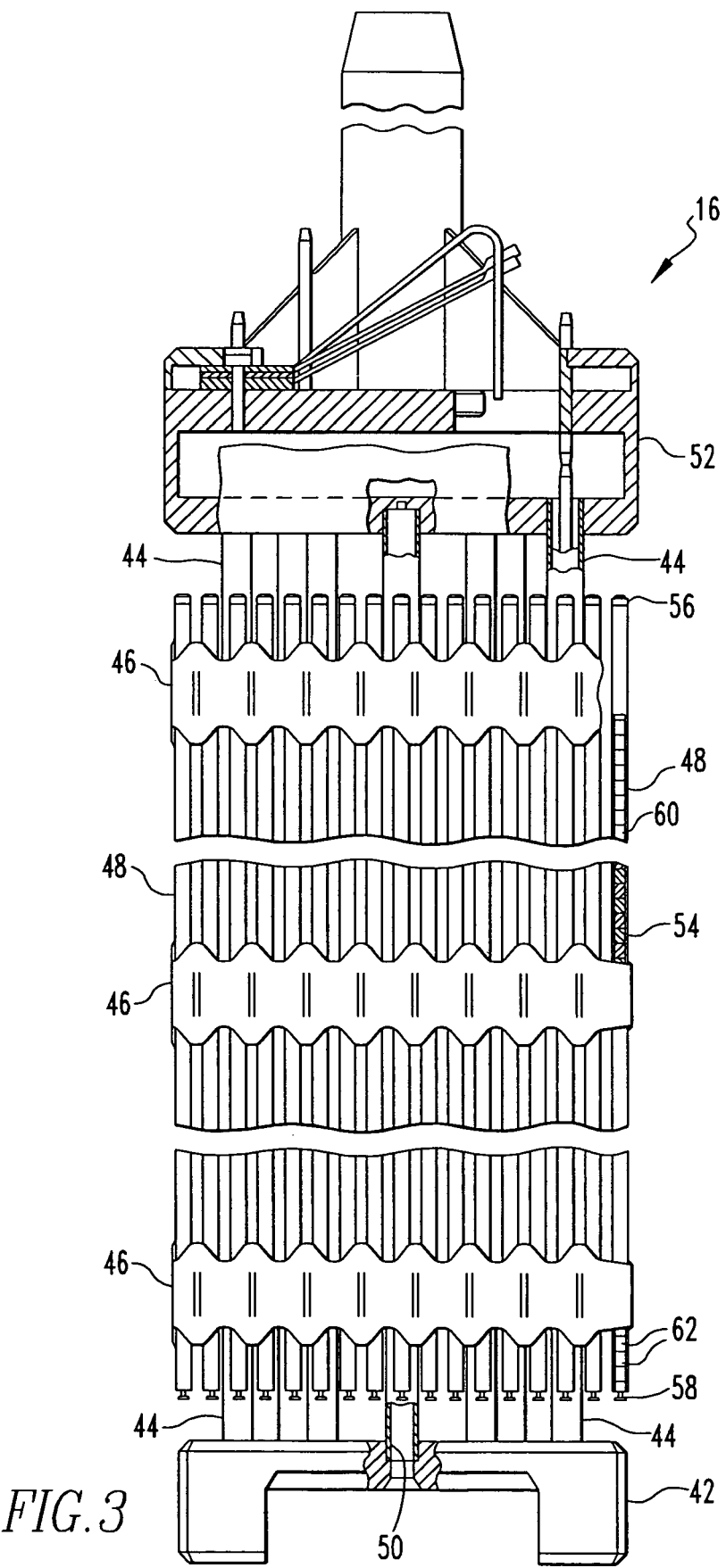
FIG. 3 is an elevational view, with parts sectioned and parts broken away for clarity, of one of the nuclear fuel assemblies in the reactor of FIG. 2, the fuel assembly being illustrated in vertically foreshortened form.

As briefly mentioned above, the reactor core 14 is composed of a large number of elongated fuel assemblies 16. Turning to FIG. 3, each fuel assembly 16, being of the type used in the PWR 10, basically includes a lower end structure or bottom nozzle 42 which supports the assembly on the lower core plate 26 and a number of longitudinally extending guide tubes or thimbles 44 which project upwardly from the bottom nozzle 42. The assembly 16 further includes a plurality of transverse support grids 46 axially spaced along the lengths of the guide thimbles 44 and attached thereto. The grids 46 transversely space and support a plurality of fuel rods 48 in an organized array thereof. Also, the assembly 16 has an instrumentation tube 50 located in the center thereof and an upper end structure or top nozzle 52 attached to the upper ends of the guide thimbles 44. With such an arrangement of parts, the fuel assembly 16 forms a integral unit capable of being conveniently handled without damaging the assembly parts.

Figure 4:
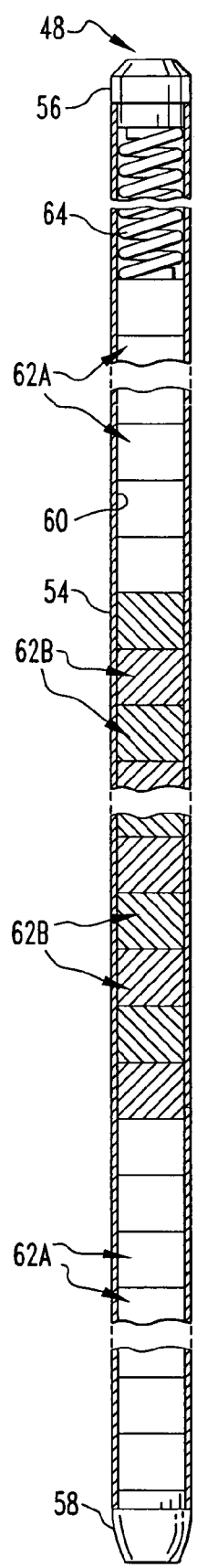
FIG. 4 is enlarged foreshortened longitudinal axial sectional view of a fuel rod of the fuel assembly of FIG. 3 containing a middle string of boron-containing fuel pellets with upper and lower end strings of uncoated fuel pellets.

As seen in FIGS. 3 and 4, each of the fuel rods 48 of the fuel assembly 16 has an identical construction insofar as each includes an elongated hollow cladding tube 54 with a top end plug 56 and a bottom end plug 58 attached to and sealing opposite ends of the tube 54 defining a sealed chamber 60 therein. A plurality of nuclear fuel pellets 62 are placed in an end-to-end abutting arrangement or stack within the chamber 60 and biased against the bottom end plug 58 by the action of a spring 64 placed in the chamber 60 between the top of the pellet stack and the top end plug 56.

In the operation of a PWR, it is desirable to prolong the life of the reactor core 14 as long as feasible to better utilize the uranium fuel and thereby reduce fuel costs. To attain this objective, it is common practice to provide an excess of reactivity initially in the reactor core 14 and, at the same time, provide means to maintain the reactivity relatively constant over its lifetime.

FIGS. 2, 3 and 4 illustrate a preferred embodiment of the present invention, to achieve this objective. As can be seen in FIGS. 3 and 4, a fuel rod 48 has some end-to-end arrangements, or strings, of fuel pellets 62A containing no boron compound, provided at upper and lower end sections of the fuel pellet stack of the fuel rod 48 as an axial blanket. The fuel rod 48 also has a string of the fuel pellets 62B with the boron-containing compound provided at the middle section of the stack.

Referring to FIG. 2, there is shown one preferred embodiment of an arrangement in the nuclear reactor core 14 in accordance with the present invention, of assemblies with fuel rods having no boron-containing compound, denoted by an "o" in FIG. 2, and assemblies in which all the fuel rods in the assembly have at least one pellet of fuel with a boron-containing compound, denoted by an "x" in FIG. 2.

By way of example only, Table 1 below provides information comparing an assembly of the present invention with prior art practice.

TABLE 1

|  | Original Rods With IFBA-coated Fuel ($ZrB_2$) | Rods with $UB_4$ (present invention) |
|---|---|---|
| Boron loading | 10 mg/inch | 325.5 ppm |
| Percent of all rods coated With $ZrB_2$ or containing $UB_4$ | 60% | 100% |
| Pellet diameter | 0.37 inches | 0.37 inches |
| $UO_2$ density | 10.47 gm/cm$^3$ | 10.47 gm/cm$^3$ |
| $UO_2$ loading | 18.43 gm $UO_2$/inch | 18.43 gm $UO_2$/inch |
| $^{10}B$ loading | 108.5 ppm | 65.1 ppm |
| $^{10}B$ level in total amount of Boron | 20% | 20% |
| Smeared $^{10}B$ loading | 65.1 ppm | 65.1 ppm |
| Total B loading | 524.5 ppm | 325.5 ppm |
| $UB_4$ loading |  | 2119 ppm $UB_4$ |
| % of pellets with IFBA or $UB_4$ | 100% | 100% |

Whereas particular embodiments of this invention have been described above for purposes of illustration, it will be evident to those skilled in the art that numerous variations of the details of the present invention may be made without departing from the invention as defined in the appended claims.

What is claimed is:

1. A fuel assembly comprising a plurality of fuel rods, each fuel rod containing a plurality of nuclear fuel pellets not requiring coatings, wherein at least one fuel pellet in more than 50% of said fuel rods in said fuel assembly comprises a sintered admixture consisting of $UO_2$ and $ZrB_2$.

2. The fuel assembly of claim 1, wherein said $ZrB_2$ is present in said fuel pellet in an amount of about 5 ppm to about 5 wt %, based on the total amount of fuel in said fuel pellet.

3. The fuel assembly of claim 2, wherein boron of said $ZrB_2$ is present in said fuel pellet in an amount of about 10 ppm to about 20,000 ppm, based on the total amount of fuel in said fuel pellet.

4. The fuel assembly of claim 1, wherein said $ZrB_2$ in said at least one fuel pellet comprises enriched boron.

5. The fuel assembly of claim 4, wherein said enriched boron is enriched to a content of $^{10}B$ greater than natural boron.

6. The fuel assembly of claim 1, wherein at least one fuel pellet in at least 60% of said fuel rods in said fuel assembly comprises a sintered admixture of $UO_2$.

7. The fuel assembly of claim 1, wherein at least one fuel pellet in at least 70% of said fuel rods in said fuel assembly comprises a sintered admixture of $UO_2$ and $ZrB_2$.

8. The fuel assembly of claim 1, wherein at least one fuel pellet in at least 80% of said fuel rods in said fuel assembly comprises a sintered admixture of $UO_2$ and $ZrB_2$.

9. The fuel assembly of claim 1, wherein at least one fuel pellet in at least 90% of said fuel rods in said fuel assembly comprises a sintered admixture of $UO_2$ and $ZrB_2$.

10. The fuel assembly of claim 1, wherein at least one fuel pellet in more than 50% and less than 90% of said fuel rods in said fuel assembly comprises a sintered admixture of $UO_2$ and $ZrB_2$.

11. The fuel assembly of claim 3, wherein the boron is 600 to 20000 ppm of the admixture.

12. A boiling water reactor having a fuel assembly, the fuel assembly comprising a plurality of fuel rods, each fuel rod containing a plurality of nuclear fuel pellets not requiring coatings, wherein at least one fuel pellet in more than 50% of said fuel rods in said fuel assembly comprises a sintered admixture consisting of $UO_2$ and $ZrB_2$.

\* \* \* \* \*

UNITED STATES PATENT AND TRADEMARK OFFICE
Certificate

Patent No. 7,139,360 B2                                                                      Patented: November 21, 2006

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Edward J. Lahoda, Pittsburgh, PA (US); Lars Hallstadius, Vasteras, Sweden.

Signed and Sealed this Thirteenth Day of February 2007.

JACK KEITH
*Supervisory Patent Examiner*
Art Unit 3663